(12) United States Patent
Fewel

(10) Patent No.: US 6,377,171 B1
(45) Date of Patent: Apr. 23, 2002

(54) ON-LINE FILTER MONITORING SYSTEM

(75) Inventor: Kenneth J. Fewel, Dallas, TX (US)

(73) Assignee: Peerless Mfg. Co., Dallas, TX (US)

(*) Notice: Subject to any disclaimer, the term of this patent is extended or adjusted under 35 U.S.C. 154(b) by 0 days.

(21) Appl. No.: 09/396,915

(22) Filed: Sep. 15, 1999

(51) Int. Cl.⁷ ............................................. G08B 19/00
(52) U.S. Cl. ...................... 340/522; 340/603; 340/607; 73/861.47; 73/861.02
(58) Field of Search ................................ 340/603, 606, 340/607; 73/861.47, 861.02, 861.63, 721

(56) References Cited

U.S. PATENT DOCUMENTS

| | | | |
|---|---|---|---|
| 5,469,749 A | * 11/1995 | Shimada et la. | 73/861.47 |
| 5,511,413 A | 4/1996 | Pfister et al. | 73/118.1 |

FOREIGN PATENT DOCUMENTS

| | | |
|---|---|---|
| DE | 38 35 672 A | 4/1990 |
| EP | 0 464 321 A | 1/1992 |
| EP | 0 788 826 A | 8/1997 |

* cited by examiner

*Primary Examiner*—Daryl Pope
(74) *Attorney, Agent, or Firm*—Sidley Austin Brown & Wood

(57) ABSTRACT

A monitoring system (10) is disclosed for monitoring the condition of a filter (16) filtering a gas or liquid. Using various sensors, the permeability of the filter is monitored on a continuous basis. A significant increase in permeability, decrease in permeability or rate of change of permeability can lead to an indication of filter failure, such as rupture, leakage, loading and unloading. The system can be monitored by a computer and monitored from a remote location through phone lines and Internet computer systems.

25 Claims, 1 Drawing Sheet

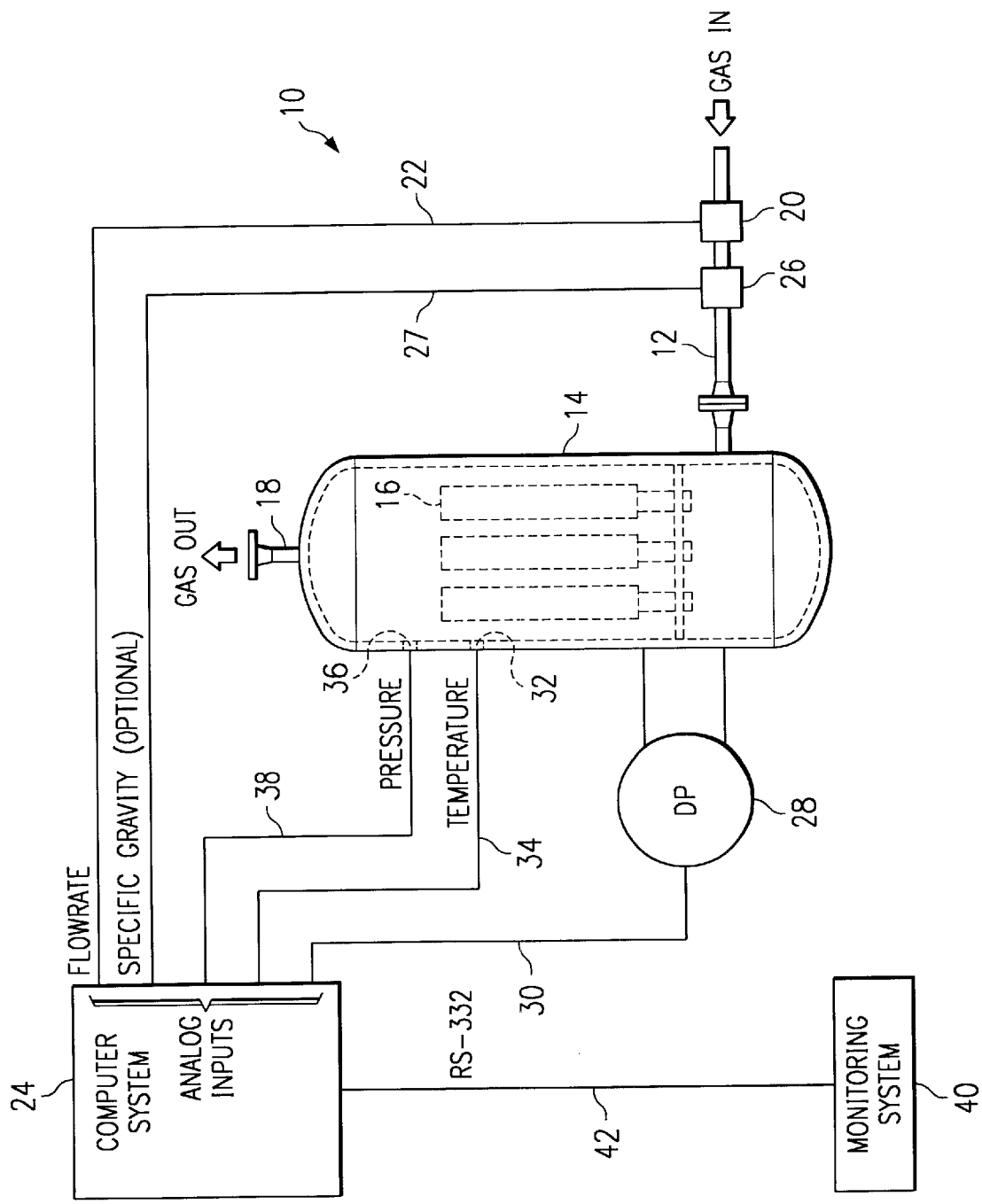

ON-LINE FILTER MONITORING SYSTEM

TECHNICAL FIELD OF THE INVENTION

This invention relates to continuous monitoring of the condition of a filter.

BACKGROUND OF THE INVENTION

Filters are utilized in a wide variety of applications. Many industrial applications require the filtering of process gases, for example.

One concern that has always existed in a filtering environment is the desire to know the condition of the filter to ensure that it is performing its filtering task. Filters can become loaded or plugged and no longer permit effective filtering. Filters can also rupture and leak, permitting unfiltered material to pass through or around the filter. A need exists for a system of monitoring the condition of the filter.

SUMMARY OF THE INVENTION

In accordance with one aspect of the present invention, a monitoring system is provided for use with a filter assembly having a filter, an inflow path for a material to flow to the filter and an outflow path for material to flow from the filter. The monitoring system includes a flow meter to sense volume flow, a differential pressure sensor to sense the pressure difference in the inflow path and the outflow path, a pressure sensor for the flow and a temperature sensor to sense the temperature of the flow. A computer takes input from the flow meter, differential pressure sensor and temperature sensor to calculate the permeability of the filter. This provides an indication of filtering effectiveness.

In accordance with another aspect of the present invention, the monitoring system computer has an alarm which is activated by a condition of the permeability being above a predetermined value, below a predetermined value or changing at a rate exceeding a predetermined value. In accordance with another aspect of the present invention, the control is a computer that allows remote monitoring and control of the system.

BRIEF DESCRIPTION OF THE DRAWING

For a more complete understanding of the present invention and for further advantages thereof, reference is now made to the following Detailed Description, taken in conjunction with the following drawing:

FIG. 1 is a view of a monitoring system forming a first embodiment of the present invention.

DETAILED DESCRIPTION OF THE INVENTION

With reference to FIG. 1, a first embodiment of the present invention will be described. The invention is a monitoring system 10 whereby permeability of a filter can be computed and monitored continuously by a computer programmed to interpret the changes in permeability over time.

A gas or liquid to be filtered flows in an inlet line 12 to a filter vessel 14 which contains the filter 16 therein. The gas or liquid being filtered passes through filter 16 and is filtered thereby and is subsequently transported from the filter vessel through an outlet line 18. A flow meter 20 is placed in the inlet line 12 to measure the flow rate of the input gas or liquid. This flow rate is communicated through a signal line 22 to a computer system 24. An optional on-line analyzer 26 also is placed in the inlet line 12 which sends composition data to the computer system 24 for calculation of specific gravity through a signal line 27. A differential pressure transmitter 28 senses the pressure upstream of and downstream of the filter 16. A signal line 30 connects the differential pressure transmitter 28 to the computer system 24.

A temperature transmitter 32 senses the temperature of the gas or liquid flowing through the filter 16 and communicates this information through a signal line 34 to the computer system 24. A pressure transmitter 36 measures the pressure of the gas or liquid and communicates this information through a signal line 38 to the computer system 24. A monitoring system interface 40 in the form of a recorder, video monitor, modem or other data transmission device is connected to the computer system 24 through a signal line 42, typically an RS-232 line.

The purpose of the computer system 24 is to intake the data from the various sensors and calculate the permeability of the filter, providing information regarding the condition of the filter to determine rupture, leakage, loading and unloading on a real time basis. The permeability is the conduciveness to viscous flow. It is the inverse of resistance to viscous flow. In equation form:

$$d.p. = \frac{1}{k}\mu Q + K\rho \frac{Q^2}{2gc}$$

Where: d.p.=pressure drop
k=permeability of the filter media
$\mu$=gas viscosity
Q=actual gas or liquid volume flow
K=inertial resistance to flow due to minor losses
$\rho$=density of flow
gc=gravity constant
K and k are determined from measured data.

By algebraic manipulation, the permeability can be computed continuously given the other known variables in the form of analog or digital signals from transmitters attached to the filter vessel and feed line.

The equation for monitoring permeability is:

$$k = Q\mu/[(d.p.)-(K\rho Q^2)/(2gc)]$$

The computer system 24 will contain programmed algorithms which will compute the permeability and calculate the moving averages, and the rate of change of permeability with respect to several time intervals. The algorithms will compute the conditions of the filter based on this data set.

For example, the time average permeability will be computed for several time intervals and stored with time data to determine the rate of change of permeability for several time intervals. "If-then" statements can detect if the rate of change of permeability is exceeding certain limits which have been determined to indicate slugging or rupturing. Also, the direction of rate of change can differentiate between loading or unloading. The long range steady rate of decrease in permeability can allow estimation of filter life remaining.

Viscosity of the gas will be measured by an indirect method, utilizing temperature, and if available, specific gravity of the gas or liquid. Table lookups or analytical formulas can be used to calculate viscosity.

A number of conditions can be detected by monitoring permeability. A first condition is filter rupture or leakage. If permeability were to increase suddenly by a significant amount, then a break would be indicated. This could be detected by the use of a limit rate of change which would be an indicator of rupture, if the rate of change is positive.

Filter slugging can be detected. If permeability were to decrease suddenly by a significant amount, liquid slugging of the filter would be indicated. This could be determined by a negative rate of change of permeability limit. Filter slugging could be a result of primary separator carryover or need for a primary separator. Filter unloading can be detected. If the rate of change in permeability changes to a flat or increasing level with time, then unloading would be indicated. Filter changeout would be urgently indicated.

The time for changeout can be monitored. This monitoring system could also be useful in estimating the time left before filter changeout would be necessary. Knowing the rate of change of permeability and the level at which changeout would be recommended allows a calculation of the hours to changeout.

Filter loading can be measured, By measuring the rate of decrease in permeability, the effective loading of solid particulate can be estimated. Also, the level of permeability would indicate liquid loading in liquid coalescing service.

As noted, the monitoring system 40 can be a modem. This permits the computer system 24 to be connected with a remote terminal hooked to a phone system which allows sending of the data regarding permeability in serial form over phone lines and through the Internet computer system worldwide web, if desired. Thus, the actual computer system 24 can be remotely located from the filter 16. Thus, the filter conditions or a number of filters could be monitored and controlled remotely from a single location from any geographical position which has adequate communication to the computer system 24.

Previous designs include the use of a pressure differential gauge to monitor filter life. This is not always adequate due to the very significant inertial losses that are present in pressurized service. The inertial losses due to expansion, contraction, and bends are large enough in pressurized service to make the viscous filter losses relatively insignificant and undetectable with a filter differential pressure gauge. By separating and subtracting out the known inertial losses, the viscous filter loss is known very accurately and can be monitored over time to determine the above conditions.

Whereas the present invention has been described with respect to a specific embodiment thereof, it will be understood that various changes and modifications will be suggested to one skilled in the art and it is intended to encompass such changes and modifications as fall within the scope of the appended claims.

What is claimed is:

1. A monitoring system for use with a filter assembly having a filter, an inflow path for a material to flow to and through the filter and an outflow path for material to flow from the filter, comprising:
   a flow meter to sense the volume flow of the material;
   a differential pressure sensor to sense the pressure difference between the inflow path and outflow path;
   a pressure sensor to sense a pressure of the material;
   a temperature sensor to sense the temperature of the material; and
   a control operatively connected to the flow meter, differential pressure sensor, pressure sensor and temperature sensor to input the sensed volume flow, pressure difference, pressure, and temperature to calculate the permeability of the filter.

2. The monitoring system of claim 1 wherein the control has an alarm activated by a condition of the permeability being above a predetermined value.

3. The monitoring system of claim 1 wherein the control has an alarm activated by a condition of the permeability being below a predetermined value.

4. The monitoring system of claim 1 wherein the control has an alarm activated by a condition of the permeability changing at a rate exceeding a predetermined value.

5. The monitoring system of claim 1 wherein the control is a computer.

6. The monitoring system of claim 1 wherein the control detects filter rupture.

7. The monitoring system of claim 1 wherein the control detects filter leakage.

8. The monitoring system of claim 1 wherein the control detects filter slugging.

9. The monitoring system of claim 1 wherein the control detects filter unloading.

10. The monitoring system of claim 1 wherein the control calculates the time to filter changes based on permeability.

11. The monitoring system of claim 1 wherein the control determines particle loading of the filter.

12. The monitoring system of claim 1 further comprising a remote computer terminal in communication with said control.

13. The monitoring system of claim 1 wherein the permeability is calculated according to a relationship between at least the volume flow of the material, the viscosity of the material, and the pressure difference between the inflow path and the outflow path.

14. The monitoring system of claim 1 wherein the permeability is calculated by the control based upon the equation:

$$k = \frac{Q\mu}{(d.p.) - \frac{(K\rho Q^2)}{2gc}}$$

wherein:
   k=the permeability of the filter;
   Q=the volume flow of the material;
   $\mu$=viscosity of the material;
   d.p.=the differential pressure;
   K=inertial resistance to flow in the filter assembly;
   $\rho$=density of the material; and
   gc=gravity constant.

15. A method for monitoring the condition of a filter within a filter assembly, the filter assembly having an inflow path for material to flow to and through the filter and an outflow path for material to flow from the filter, comprising the steps of:
   measuring a material flow volume of the material through the filter with a flow meter;
   measuring a pressure of the flow;
   measuring a pressure difference in the inflow path and the outflow path with a differential pressure sensor;
   sensing a temperature of the material with a temperature system; and
   calculating a permeability of the filter based on the sensed material volume flow, pressure, pressure difference and temperature.

16. The method of claim 15 further comprising the step of activating an alarm where a condition of permeability is above a pre-determined value, below a pre-determined value, or changing at a rate exceeding a pre-determined value.

17. The method of claim 15 further comprising the step of detecting a filter rupture based on the thus calculated permeability.

18. The method of claim 15 further comprising the step of detecting filter leakage based on the thus calculated permeability.

19. The method of claim 15 further comprising the step of detecting filter slugging based on the thus calculated permeability.

20. The method of claim 15 further comprising the step of detecting filter unloading based on the thus calculated permeability.

21. The method of claim 15 further comprising the step of calculating an interval to filter change based on the thus calculated permeability.

22. The method of claim 15 further comprising the step of determining particle loading of the filter based on the thus calculated permeability.

23. The method of claim 15 further comprising the step of monitoring the permeability by a remote computer network.

24. The method of claim 15 wherein the step of calculating permeability is carried out according to a relationship between at least the volume flow of the material, the viscosity of the material, and the pressure difference between the inflow path and the outflow path.

25. The method of claim 15 wherein the step of calculating the permeability of the filter is carried out according to the equation:

$$k = \frac{Q\mu}{(d.p.) - \frac{(K\rho Q^2)}{2gc}}$$

wherein:
k=the permeability of the filter;
Q=the volume flow of the fluid;
$\mu$=viscosity of the fluid;
d.p.=the differential pressure;
K=inertial resistance to flow in the filter assembly;
$\rho$=density of the fluid; and
gc=gravity constant.

* * * * *